United States Patent
Alanen et al.

(10) Patent No.: US 11,991,624 B2
(45) Date of Patent: May 21, 2024

(54) WIRELESS ACCESS ESTABLISHMENT

(71) Applicant: Nokia Technologies Oy, Espoo (FI)

(72) Inventors: Olli Alanen, Vantaa (FI); Mika Kasslin, Espoo (FI); Veli-Matti Kolmonen, Espoo (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 327 days.

(21) Appl. No.: 17/294,627

(22) PCT Filed: Dec. 21, 2018

(86) PCT No.: PCT/FI2018/050963
§ 371 (c)(1),
(2) Date: May 17, 2021

(87) PCT Pub. No.: WO2020/128142
PCT Pub. Date: Jun. 25, 2020

(65) Prior Publication Data
US 2022/0015028 A1    Jan. 13, 2022

(51) Int. Cl.
*H04W 48/20* (2009.01)
*H04W 48/14* (2009.01)
(Continued)

(52) U.S. Cl.
CPC .......... *H04W 48/20* (2013.01); *H04W 48/14* (2013.01); *H04W 48/16* (2013.01); *H04W 74/0808* (2013.01); *H04W 84/12* (2013.01)

(58) Field of Classification Search
CPC ..... H04W 48/20; H04W 48/14; H04W 48/16; H04W 74/0808; H04W 74/0816; H04W 84/12; H04W 88/12
(Continued)

(56) References Cited

U.S. PATENT DOCUMENTS 8,305,948 B2   1/2012  Surineni et al. ............. 370/312
9,008,152 B2   4/2015  Garikipati et al. ................ 24/8
(Continued)

FOREIGN PATENT DOCUMENTS

CN       1685669 A    10/2005
CN     104427632 A     3/2015
(Continued)

OTHER PUBLICATIONS

Chandra et al., "Beacon-Stuffing: Wi-Fi Without Associations", Eighth IEEE Workshop on Mobile Computing Systems and Applications, Mar. 8-9, 2007, pp. 1-6.
(Continued)

*Primary Examiner* — Candal Elpenord
(74) *Attorney, Agent, or Firm* — Harrington & Smith

(57) ABSTRACT

According to an example aspect of the present invention, there is provided a method, comprising: transmitting an association request from a wireless device to a first access node of a wireless network for associating the wireless device to the wireless network, wherein the wireless network comprises a centralized unit and a plurality of access nodes, including the first access node, receiving an association response from the first access node for associating the wireless device to the wireless network, performing carrier sensing on a plurality of channels; selecting a second access node among the plurality of access nodes in response to obtaining a transmission opportunity for a channel of the plurality of channels, wherein the selecting is based at least partly on a record of ongoing transmission opportunities, and transmitting data from the wireless device to the second access node during the transmission opportunity.

23 Claims, 8 Drawing Sheets

(51) Int. Cl.
*H04W 48/16* (2009.01)
*H04W 74/08* (2009.01)
*H04W 74/0808* (2024.01)
*H04W 84/12* (2009.01)

(58) Field of Classification Search
USPC .................................................. 370/329–330
See application file for complete search history.

(56) References Cited

U.S. PATENT DOCUMENTS

| | | | |
|---|---|---|---|
| 9,380,602 B2 | 6/2016 | Park et al. | |
| 9,860,926 B2 | 1/2018 | Alanen et al. | 76/21 |
| 9,894,665 B2 | 2/2018 | Reddy et al. | 72/85 |
| 10,015,726 B2 | 7/2018 | Park et al. | 48/14 |
| 10,057,846 B2 | 8/2018 | Mohamed et al. | 48/20 |
| 10,075,925 B2 | 9/2018 | Lepp et al. | 52/30 |
| 10,159,039 B2 | 12/2018 | Kannan | 48/20 |
| 11,665,738 B2* | 5/2023 | Wang | H04L 27/0006 370/329 |
| 2011/0032913 A1* | 2/2011 | Patil | H04W 72/54 370/338 |
| 2011/0110349 A1* | 5/2011 | Grandhi | H04W 28/18 370/338 |
| 2014/0328268 A1 | 11/2014 | Zhu et al. | 370/329 |
| 2015/0373587 A1* | 12/2015 | Josiam | H04L 5/0064 370/338 |
| 2016/0043843 A1* | 2/2016 | Liu | H04L 5/0048 370/329 |
| 2017/0019909 A1* | 1/2017 | Si | H04W 72/02 |
| 2017/0034831 A1* | 2/2017 | Yerramalli | H04W 74/0808 |
| 2017/0064619 A1* | 3/2017 | Neelisetty | H04L 43/12 |
| 2017/0064739 A1 | 3/2017 | Hedayat et al. | 74/8 |
| 2017/0311325 A1 | 10/2017 | Carion et al. | 72/453 |
| 2018/0014297 A1 | 1/2018 | Kang et al. | 72/446 |
| 2018/0035467 A1 | 2/2018 | Kudo et al. | 72/833 |
| 2018/0242373 A1 | 8/2018 | Wang et al. | 74/875 |
| 2018/0310240 A1 | 10/2018 | Kannan | |
| 2020/0092881 A1* | 3/2020 | Nezou | H04W 72/23 |

FOREIGN PATENT DOCUMENTS

| | | |
|---|---|---|
| CN | 105636078 A | 6/2016 |
| CN | 106788910 A | 5/2017 |
| CN | 107750473 A | 3/2018 |
| GB | 2539285 B | 12/2017 |
| WO | WO-2016/039569 A1 | 3/2016 |
| WO | WO-2017/119470 A1 | 7/2017 |

OTHER PUBLICATIONS

Zhu et al., "A Multi-AP Architecture for High-Density WLANs: Protocol Design and Experimental Evaluation", 5th Annual IEEE Communications Society Conference on Sensor, Mesh and Ad Hoc Communications and Networks, Jun. 16-20, 2008, pp. 28-36.

"The Benefits of Centralization in Wireless LANs via the Cisco Unified Wireless Network", White Paper, Cisco Systems, 2006, pp. 1-13.

Invitation to Pay Additional Fees and Partial Search Report received for corresponding Patent Cooperation Treaty Application No. PCT/FI2018/050963, dated Sep. 24, 2019, 11 pages.

International Search Report and Written Opinion received for corresponding Patent Cooperation Treaty Application No. PCT/FI2018/050963, dated Nov. 15, 2019, 17 pages.

"WF on UL Channel Access Schemes", Ericsson, 3GPP TSG RAN WG1 Meeting #84bis, R1-163810, Apr. 2016, 5 pages.

"WF on UE initiated TxOP/MCOT shared by the eNB", ZTE, 3GPP TSG RAN WG1 Meeting #85, R1-164605, May 2016, 3 pages.

Choi, Sunghyun et al., "IEEE 802.11$^e$ Contention-Based Channel Access (EDCF) Performance Evaluation", IEEE, May 2003, pp. 1151-1156.

"IEEE P802.11 Wireless LANs 11ax D2.2 MAC Comment Resolution for NAV Part III", Feb. 2018, 9 pages.

"802.11 QoS Tutorial", doc: IEEE 802.11-08/1214-02-00aa, Nov. 10, 2008, 24 pages.

"REview of existing approaches and use cases of obtaining transmission opportunity from ultiple channels", doc.: IEEE 802.11-17/0410r0, Mar. 12, 2017, 20 pages.

\* cited by examiner

WIRELESS ACCESS ESTABLISHMENT

RELATED APPLICATION

This application was originally filed as PCT Application No. PCT/FI2018/050963 on Dec. 21, 2018 which is incorporated herein by reference in its entirety.

FIELD

Various example embodiments relate to wireless communications, and in particular to wireless access establishment and association for wireless devices.

BACKGROUND

In many wireless networks wireless access is based on shared access to a wireless medium. Wireless devices may tune on the same channel and try to transmit data. To avoid collisions, several techniques exist, such as the carrier sense multiple access (CSMA). If the medium is busy, then a device needs to wait for the medium to become idle and available. There is a continuing demand to further develop and improve technologies facilitating to reduce variation in wireless access delays.

SUMMARY

Some aspects of the invention are defined by the features of the independent claims. Some specific embodiments are defined in the dependent claims.

According to a first aspect of the present invention, there is provided a method, comprising: transmitting an association request from a wireless device to a first access node of a wireless network for associating the wireless device to the wireless network, wherein the wireless network comprises a centralized unit and a plurality of access nodes, including the first access node, receiving an association response from the first access node for associating the wireless device to the wireless network, performing carrier sensing on a plurality of channels; wherein the carrier sensing comprises
   a) contending for channel access on the plurality of channels, and
   b) maintaining a record of ongoing transmission opportunities on the plurality of channels, wherein the record comprises information on which access nodes of the wireless network are owners or receivers of the ongoing transmission opportunities, the method further comprising
selecting a second access node among the plurality of access nodes in response to obtaining a transmission opportunity for a channel of the plurality of channels, wherein the selecting is based at least partly on the record, and transmitting data from the wireless device to the second access node during the transmission opportunity.

According to a second aspect of the present invention, there is provided a method, comprising: receiving from a first access node an association request of a wireless device for associating to a wireless network, wherein the wireless network comprises a centralized unit and a plurality of access nodes, including the first access node, establishing, by the centralized unit, an association with the wireless device in response to the association request, transmitting, from the centralized unit to the first access node, information for transmitting an association response to the wireless device, selecting, by the centralized unit, a second access node among the plurality of access nodes in response to receiving a first set of downlink data destined to the associated wireless device, wherein the selecting is based on access node status record maintained by the centralized unit, and transmitting, from the centralized unit to the selected second access node, the first set of downlink data destined to the associated wireless device.

There are also provided an apparatus comprising at least one processor, at least one memory including computer program code, the at least one memory and the computer program code being configured to, with the at least one processor, cause the apparatus at least to carry out features in accordance with the first and/or second aspect or an embodiment thereof. According to still further aspects, there are provided a computer program and a computer-readable medium configured to carry out features in accordance with the first and/or second aspect or an embodiment thereof. According to an aspect, there is provided an apparatus comprising means for causing the apparatus to carry out the method or an embodiment of any one of the method claims.

EMBODIMENTS

Figure 1A:
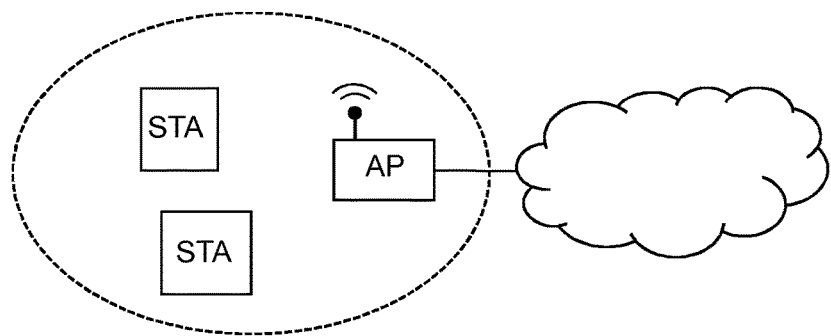
FIGS. 1a and 1b illustrate example wireless communication systems.

FIG. 1a illustrates an example wireless communication system, comprising (non-access point) stations (STA) and an access point (AP). The AP may be connected to further network elements and provide access to other networks, such as the Internet.

The STAs may associate to the AP so that they can exchange data frames. Authentication, integrity and security services may also bind to the association. In case of IEEE 802.11-based wireless local area networks (WLANs), the STA may be associated with a basic service set (BSS) which is a basic building block of IEEE 802.11-based WLANs. An infrastructure BSS includes a single AP together with all STAs associated with the AP. A plurality of BSSs may interconnect to form an extended service set (ESS).

An STA is bind by an association to an AP. In case the associated AP is busy, but another AP would be available, reassociating to the other AP in this case is complicated and takes time. If a plurality of APs would be arranged to operate on the same channel and with a single BSS identifier (BSSID), the STAs are not aware on which APs they are associated. Thus, the APs would need to be well synchronized and scanning may cause problems, as the APs appear as the same AP. Hence, signal strength and quality may vary considerably. There is need to further develop technologies and access methods to lower wireless access latencies, as the services of the future, such as ultra-reliable low latency communications (URLLC) that are assumed to require ultra-low latencies, such as 1 ms or less.

There is now provided an improved solution facilitating to reduce wireless access delays. A new network-association operation mode is now provided, in which a wireless device associates to a wireless network comprising a plurality of access points. The wireless device may select an access node separately for each transmission opportunity during the association. The transmission opportunity (TXOP) refers generally to bounded availability of a transmission resource for a transmitting device, in an embodiment to a TXOP in IEEE 802.11 based systems. The TXOP may thus refer to the amount of time a station can send frames when it has won contention for the wireless medium. Similarly, in downlink, the network may be configured to select which access node is used for transmitting a packet to the wireless device.

Figure 1B:
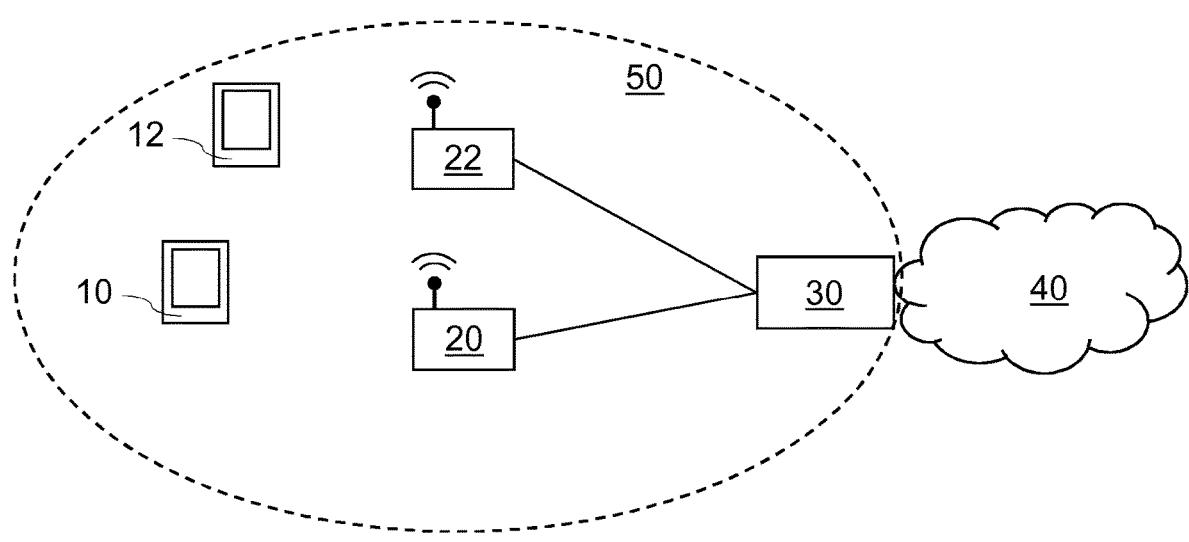

With reference to the example of FIG. 1b, the system comprises one or more wireless communications devices 10, 12 and access nodes 20, 22. The wireless devices 10, 12 may be user devices or machine-to-machine (M2M) type of (terminal) devices. The wireless devices 10, 12 may comprise (non-AP) STAs and the access nodes 20, 22 may be access points (AP), as referred to in the embodiments below. The APs 20, 22 may be multi-antenna devices and may be configured to utilize their spatial degrees of freedom for beamforming their transmitted signals and/or placing nulls towards coexisting devices. The AP may be a fixed AP or a mobile AP.

A centralized unit (CU) 30 may be provided in the system. The CU 30 may be configured to provide access to other networks 40, such as the Internet. The CU 30 and a plurality of APs 20, 22 may form a wireless network 50. The APs 20, 22 may be configured to operate on different channels. The STA 10, 12 may now associate to the wireless network 50 instead of a single AP. The STA may select between the AP 20 and AP 22 for each transmission opportunity during the association. The CU 30 may be a dedicated unit in the wireless network 50. In some embodiments, the CU is provided as a function. For example, the CU may be implemented as a function in a device running AP functionality, in a cloud server, or as distributed in a plurality of devices running AP functionality and belonging to the same network.

Figure 2:
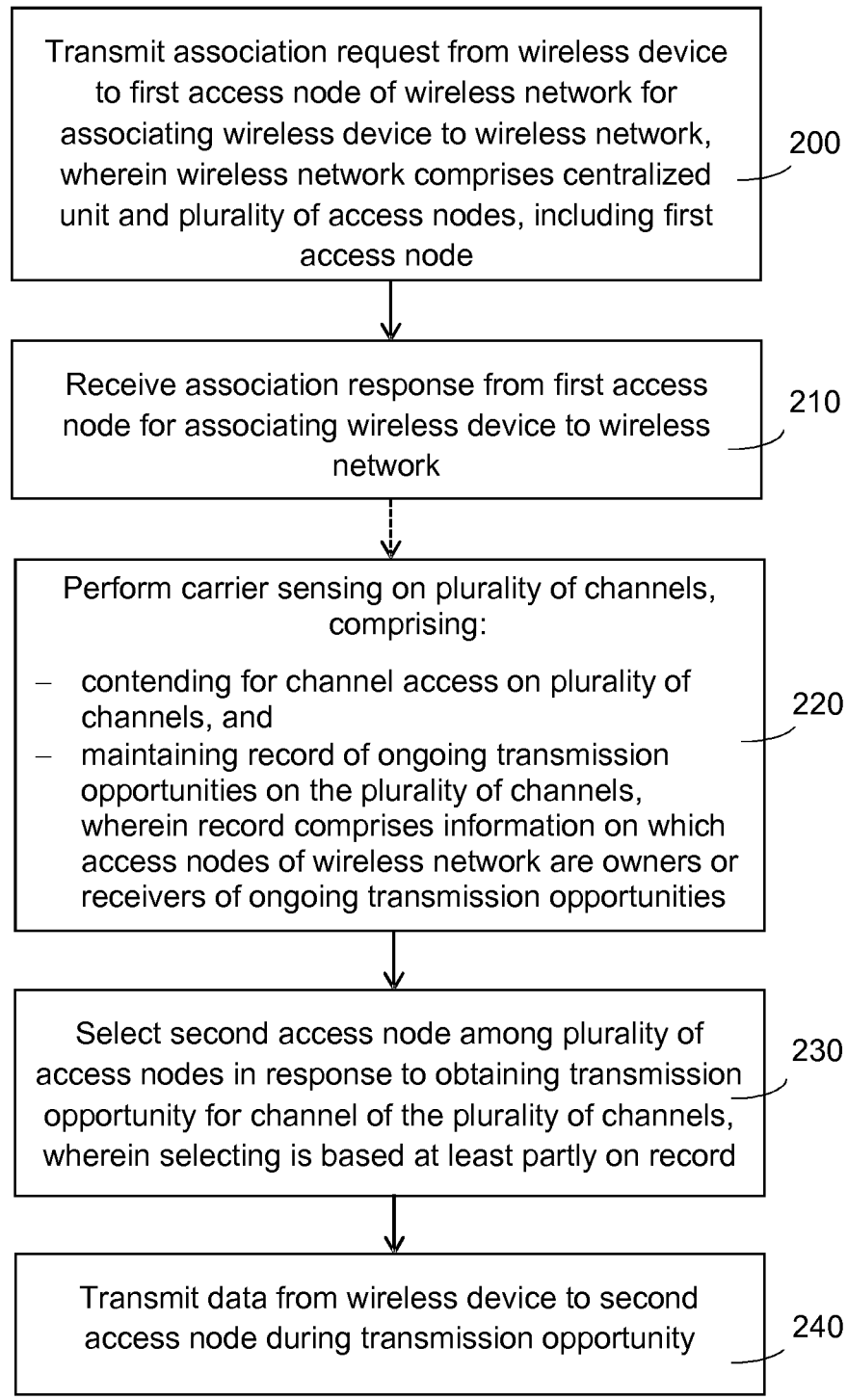
FIG. 2 illustrates a method in accordance with at least some embodiments.

FIG. 2 illustrates a method for wireless access establishment. The method may be performed in a wireless device or an apparatus controlling wireless transmission of a wireless device, such as the STA 10, 12 or a controller thereof.

The method comprises: transmitting 200 an association request from a wireless device to a first access node of a wireless network for associating the wireless device to the wireless network, wherein the wireless network comprises a centralized unit and a plurality of access nodes, including the first access node. Block 210 comprises receiving an association response from the first access node for associating the wireless device to the wireless network. Thus, the wireless device 10 may form and store an association to the wireless network, which may refer to an association to the CU 30.

Block 220 comprises performing carrier sensing on a plurality of channels. The carrier sensing comprises:
a) contending for channel access on the plurality of channels, and
b) maintaining a record of ongoing transmission opportunities on the plurality of channels, wherein the record comprises information on which access nodes of the wireless network are owners or receivers of the ongoing transmission opportunities.

The channel access contending may be performed separately on each channel of the set of channels. The record of ongoing transmission opportunities may refer generally to maintaining information on available transmission opportunities and access nodes in the wireless network. The wireless device may maintain a list of availability statuses of each access node of the wireless network.

Block 230 comprises selecting a second access node among the plurality of access nodes in response to obtaining a transmission opportunity for a channel of the plurality of channels, wherein the selecting is based at least partly on the record. The transmission opportunity is obtained by winning channel access contention on at least one channel of the set of channels—when contending for channel access on the plurality of channels in Block 220.

Block 240 comprises transmitting data from the wireless device to the second access node during the transmission opportunity. The second access node may be different from the first access node. The second access node may be configured to forward the data from the wireless device to the centralized unit for further transmission outside the wireless network.

In some embodiments, the selection 230 of the second access node is based also on received signal strength values of a number of access nodes, including the second access node. The selection may be performed among the plurality of access nodes which are determined not being owners or receivers of the ongoing transmission opportunities on any channel of the plurality of channels. The wireless device 10 may become owner of the transmission opportunity and select 230 the second access node in response to winning the contention on the channel of the plurality of channels.

The wireless device may be configured to repeat blocks 220 to 240 during the association to the wireless network. The wireless device may enter/return to block 220 when it has data to be sent via the association. In response to winning a new a subsequent contention, the wireless device may move from block 220 to block 230 and select a new access node for each new transmission opportunity. Thus, the first access node or a third access node of the wireless network may be selected for transmission during another, subsequent, transmission opportunity within the association.

The subsequent transmission opportunity may start after end of the (earlier obtained) transmission opportunity, or in some cases the subsequent transmission opportunity is overlapping with the transmission opportunity. The subsequent transmission opportunity may be based on winning contention on the same or another channel than the earlier obtained transmission opportunity.

The association request in block 200 may comprise a request for associating the wireless device to the wireless network. The association request may comprise a network association identifier (NAID) or another identifier identifying the wireless network and/or the centralized unit to which the wireless device selects to associate. In a further example embodiment, homogenous ESS identifier (HESSID) is applied as the NAID.

In some embodiments, the wireless device receives from the first access node information indicating that the first access node is part of the wireless network. For example, the information may include identifier(s) of the wireless network(s) and/or identifier(s) identifying the respective centralized unit(s), such as a network or network association identifier, or centralized unit identifier. Furthermore, the access node may send information indicating capabilities of the wireless network, such as that the wireless network supports network association. This may indicate that the wireless network supports multi-access-node network association in addition to or instead of supporting legacy association between a wireless device and a specific access node.

The further indication information may be included in beacon and/or probe response frames with new information elements or capabilities, for example. The wireless device may be configured to generate the association request on the basis of the received information. For example, upon receiving an advertisement from the first access node identifying that the access node belongs to the wireless network and the wireless network supports network association, the wireless device may generate the association request, which may comprise the identifier received in the advertisement.

Figure 3:
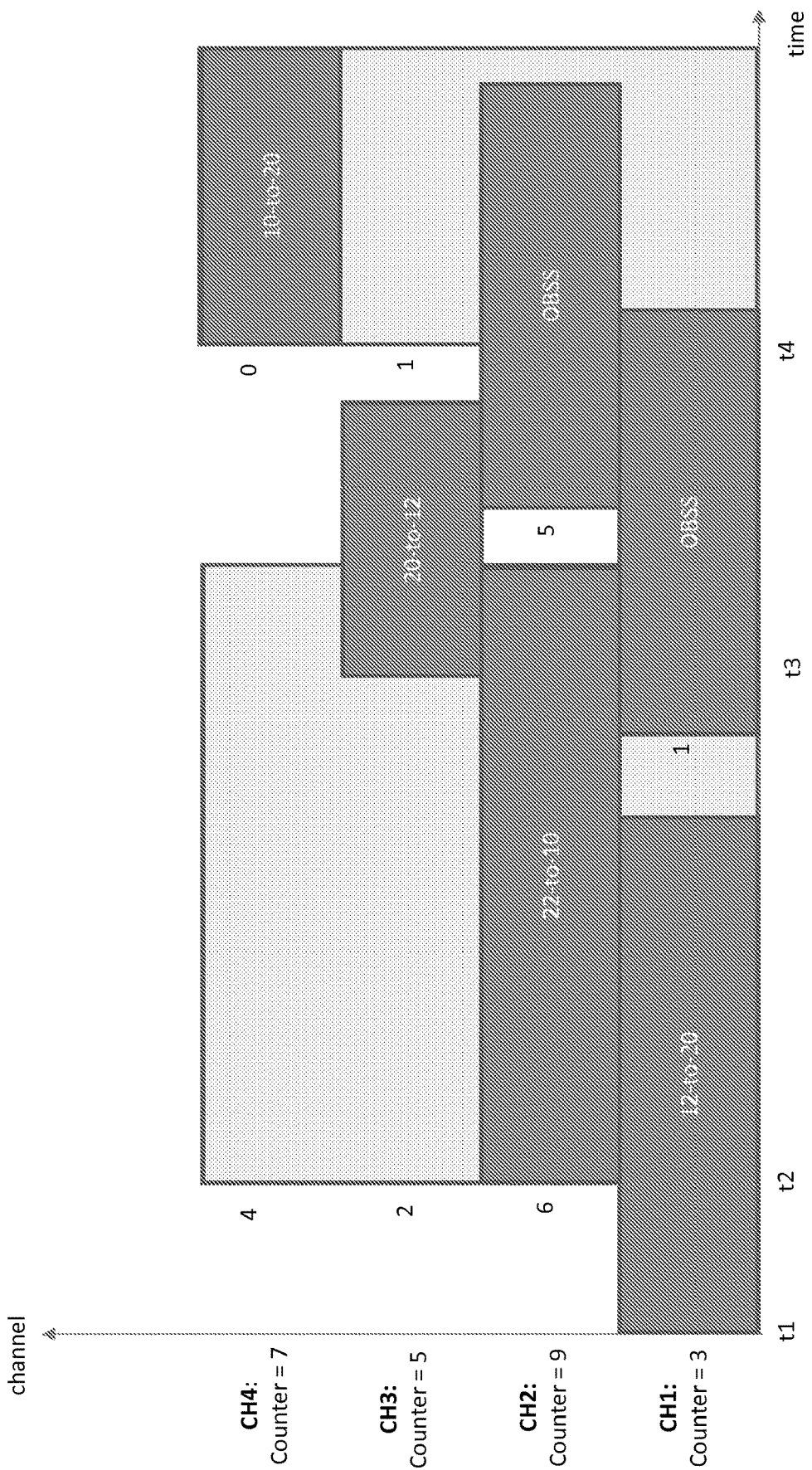
FIG. 3 illustrates an example of maintaining information on transmission opportunities.

FIG. 3 illustrates an example of ongoing TXOPs in perspective of and monitored by the wireless device 10 for four channels CH1 to CH4 in the wireless network 50. The wireless device 10 contends with other devices of the network 50 on the channels CH1 to CH4 and maintains 220 a record of ongoing TXOPs in the wireless network 50 to which it has associated. The record may comprise at least some of the information illustrated in connection with FIG. 3, particularly information of TXOPs and information of APs associated with the transmission opportunities.

The wireless device 10 maintains channel contention functionality with a backoff counter separately for each of the channels CH1 to CH4. At first time instant t1, the backoff counter values for channels CH1, CH2, CH3, and CH4 are 3, 9, 5, and 7, respectively. The counter value is reduced at each channel according to the channel status on the basis of applied contention rules. Backoff counter values are illustrated by numbers before beginning of an occupied channel period indicated by light and dark grey. At t2, the backoff counter values for channels CH2, CH3, and CH4 are 6, 2, and 4, respectively. The dark grey areas with text boxes indicate ongoing TXOPs, some of which are of another overlapping wireless network, denoted by "OBSS".

At t1 another device 12 sends to the first AP 20, as denoted by "12-to-20", at CH1. The light grey areas illustrate time periods during which the wireless device 10 either transmits or receives, whereby it may determine the other channels as occupied while it cannot listen to and compete on these channels.

At t2, the wireless device 10 detects transmission to it from the second AP 22 at CH2. At t3, the other wireless device 12 receives from the first AP 20. At t4, the backoff counter value for channel CH4 of the wireless device 10 reaches 0 which means that the wireless device 10 wins contention at CH4. Since the device has data to transmit, it uses the obtained transmission opportunity to transmit the data. On the basis of the TXOP record maintained by the wireless device 10, it detects that both APs 20 and 22 are available. The wireless device 10 may, upon winning contention on a channel (CH4), check which of the available APs of the network on that channel are available (i.e. not having ongoing TXOPs on any of the channels). In the present example, the wireless device 10 selects AP 20, e.g. based on signal strength. It will be appreciated that the record of ongoing TXOPs and comprising access node information may be implemented in various ways, e.g. in channel specific records.

Figure 4:
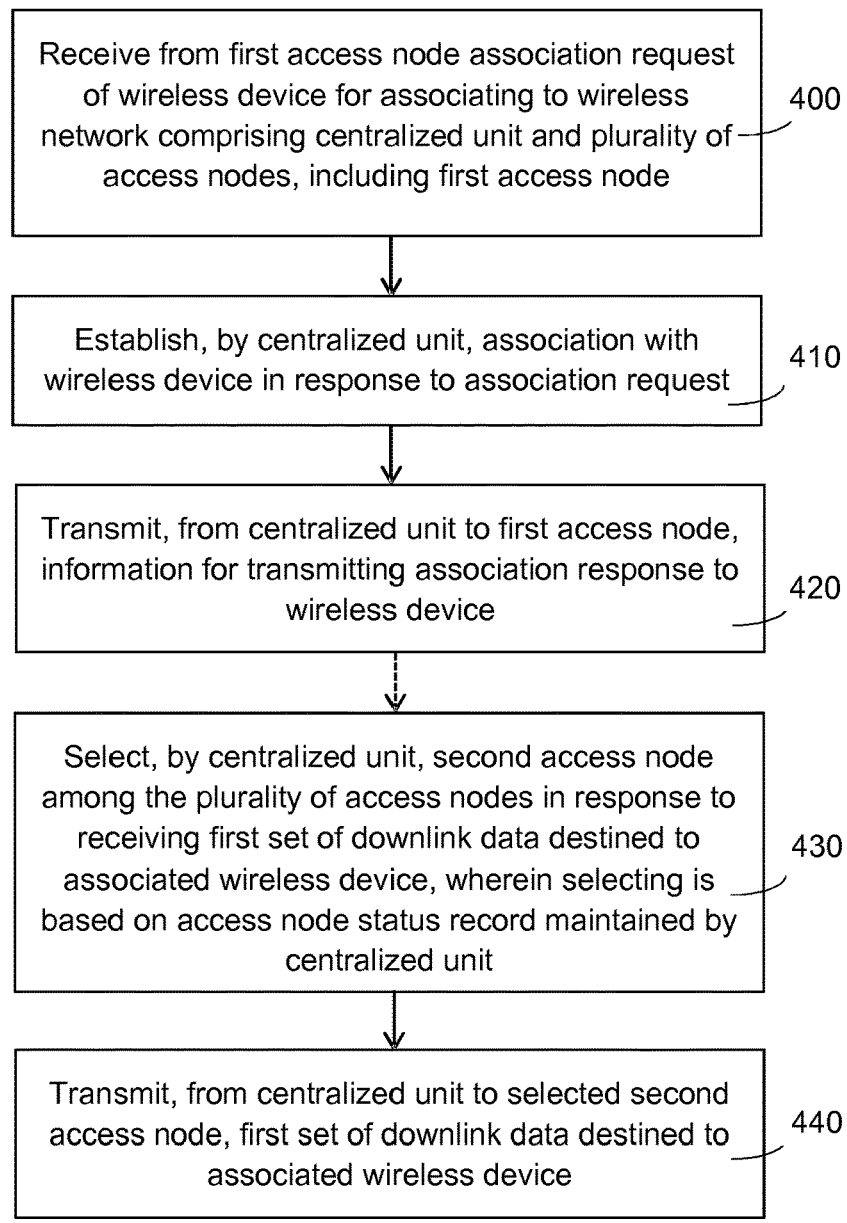
FIG. 4 illustrates a method in accordance with at least some embodiments.

FIG. 4 illustrates a method for arranging transmission of downlink data to a wireless device. The method may be performed by an apparatus controlling at least some aspects of a wireless network, such as the CU 30, or a controller thereof.

Block 400 comprises receiving from a first access node an association request of a wireless device for associating to a wireless network, wherein the wireless network comprises a centralized unit and a plurality of access nodes, including the first access node. The association request may be a forwarded message of the original (association request) message received from the wireless device by the access node. Alternatively, the association request may be a modified version of the association request from the wireless device. For example, the access node may be configured to forward only a subset of the information in the original association request to the centralized unit, relevant for functions of the centralized unit in the wireless network and for associating the wireless device to the wireless network.

Block 410 comprises establishing, by the centralized unit, an association with the wireless device in response to the association request. Block 420 comprises transmitting, from the centralized unit to the first access node, information for transmitting an association response to the wireless device.

Block 430 comprises selecting, by the centralized unit, a second access node among the plurality of access nodes in response to receiving a first set of downlink data destined to the associated wireless device, wherein the selecting is based on access node status record maintained by the centralized unit. Block 440 comprises transmitting, from the centralized unit to the selected second access node, the first set of downlink data destined to the associated wireless device.

The centralized unit may be configured to repeat blocks 430 and 440 during the association of the wireless device. The centralized unit may enter/return to block 220 when it has data to be sent to the wireless device via the association. Thus, in response to receiving a second set of downlink data destined to the associated wireless device, the second access node or another access node, such as the first access node or a third access node, of the wireless network may be selected within the association to transfer the second set of downlink data.

The centralized unit may be configured to receive information on measurements performed by the access points of the wireless network and maintain access node status information, which may specify at least which access points can hear the wireless device associated to the wireless network. The access node for transmitting downlink data to the wireless device may be selected 430 on the basis of the access node status information.

The presently disclosed architecture and features facilitate to shorten channel access delays as the wireless device does not need to wait that the associated access point is free and otherwise available (e.g. not unavailable due to channel contention on the channel on which that AP operates). The serving AP may now be selected separately for each transmission opportunity, in both uplink and downlink. The wireless device may be a STA (e.g. the STA 10, 12), the access node may be an AP (e.g. the AP 20, 22), and the wireless network may be a wireless local area network (e.g. the network 50), such as an 802.11ax based network. Further example embodiments are illustrated below for an 802.11 based system with references to these entities.

In WLANs the medium access control (MAC) layer communicates with the physical layer convergence protocol (PLCP) sublayer via primitives (a set of "instructive commands" or "fundamental instructions") through a service access point (SAP). When the MAC layer instructs it to do so, the PLCP prepares MAC protocol data units (MPDUs) for transmission. The PLCP minimizes the dependence of the MAC layer on the physical medium dependent (PMD) sublayer by mapping MPDUs into a frame format suitable for transmission by the PMD. The PLCP also delivers incoming frames from the wireless medium to the MAC layer. The PLCP appends a PHY-specific preamble and header fields to the MPDU that contain information needed by the physical layer transmitters and receivers. The 802.11 standard refers to this composite frame (the MPDU with an additional PLCP preamble and header) as a PLCP protocol data unit (PPDU).

Network allocation vector (NAV) is a virtual carrier-sensing mechanism used in wireless network protocols, such as IEEE 802.11 based systems, and is a logical abstraction that limits the need for physical carrier-sensing at the air interface to save power. The MAC layer frame headers contain a duration field that specifies the transmission time required for the communication. In addition, the PLCP header also carries information relevant for determining the duration of the frame being transmitted. Wireless devices listening to the wireless medium read this information and back off accordingly. For example, when a first AP 20 wishes to send to a first STA 10, it sends a request to send (RTS). When other wireless devices in the range, such as a second AP 22 or a second STA 12 detect the RTS, they set their NAV timers for the duration of the first AP transmission as specified in the RTS.

Figure 5:
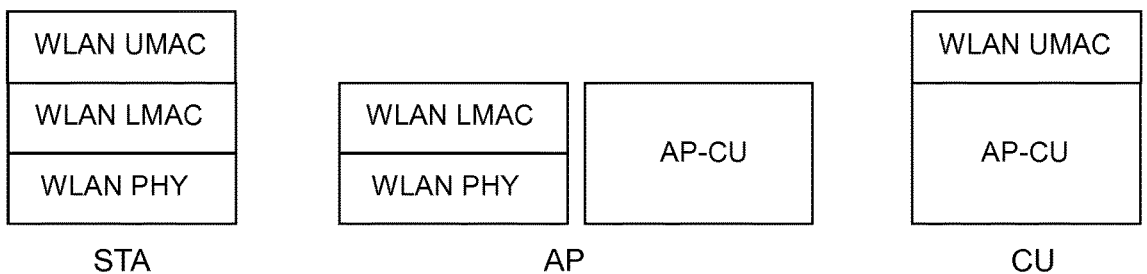
FIGS. 5 and 6 illustrate protocol architectures for a system in accordance with at least some embodiments.

FIG. 5 illustrates a protocol architecture in IEEE 802.11 based system in accordance with at least some embodiments. The WLAN MAC plane is divided to two portions, an upper MAC (UMAC) and a lower MAC (LMAC) portion. The AP is configured to perform the LMAC operations. The CU is configured to perform the UMAC operations.

In some embodiments, LMAC functions comprise radio channel access related functions, such as backoff and NAV functionality, MPDU header and CRC creation/validation, and generation of acknowledgement (ACK) and clear to send (CTS) frames. The UMAC functions may comprise data plane and management functions, such as data unit aggregation/de-aggregation, queuing, sequence number assignment, fragmentation/defragmentation, packet number assignment, and encryption/decryption.

The AP and the CU are configured to communicate over a wired or wireless AP-CU interface, such as Ethernet or WLAN based link. The parties exchange MPDUs using this link, and there may also be an encapsulation mechanism introduced. A tunneling protocol, such as generic routing encapsulation (GRE) or IPSec tunnel, may be applied, or another secure method for transmission may be applied.

Figure 6:
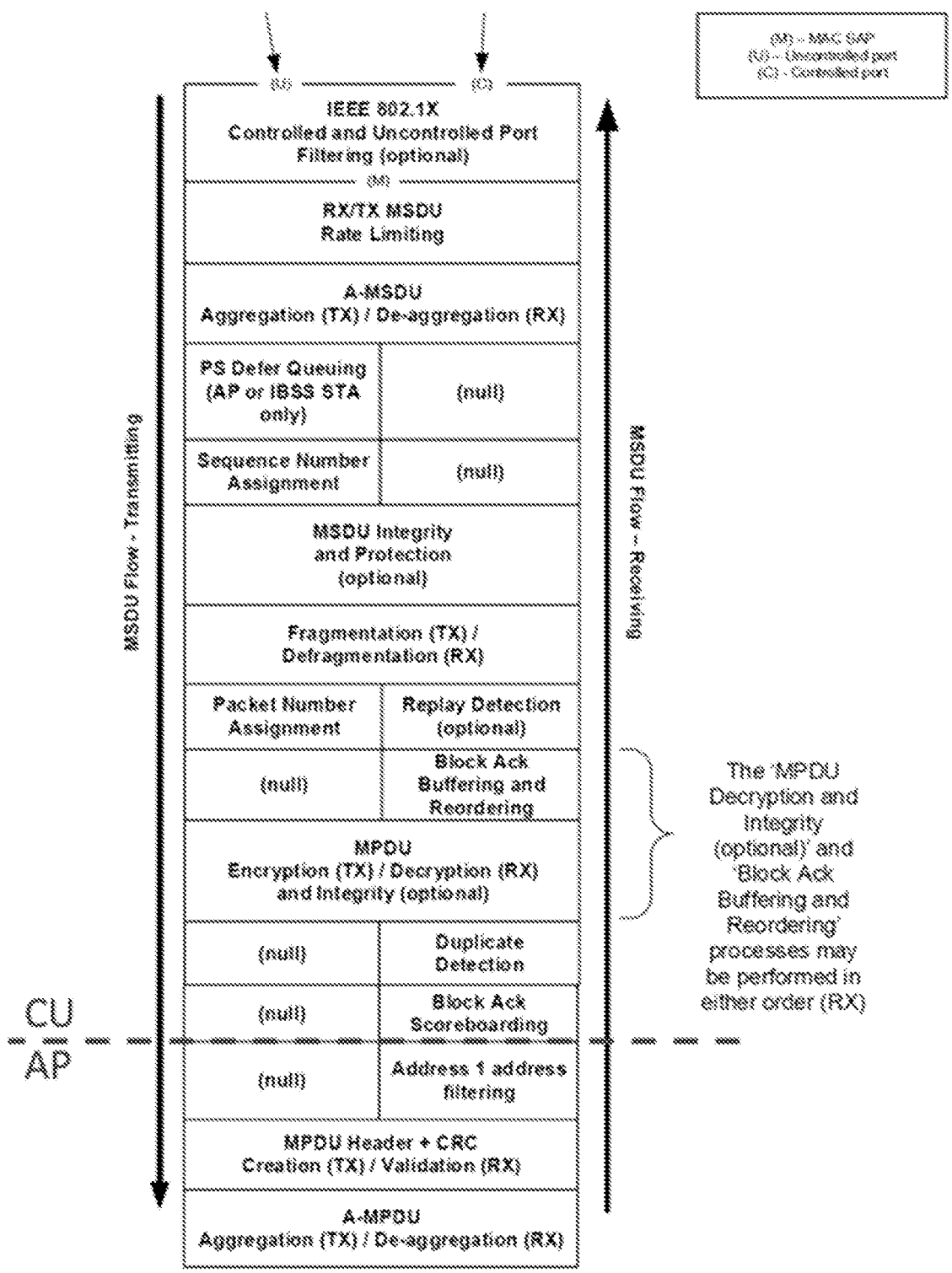

FIG. 6 illustrates an example of a MAC architecture for an IEEE 802.11 based network and functional split between the CU and the AP. In this split, most MAC functions are located in the CU, in addition to handling of the wireless network management. The AP is configured to carry out channel access related functions, such as backoff, NAV, and generation of ACK and CTS frames.

Acknowledgements may be generated and transmitted in similar way as when the STA is associated to an AP, so the APs will handle them in case of downlink and STA in case of uplink. The CTS messages should also be handled in similar way. When it comes to the frames such as BACKs, however, the functionality should be moved to the CU. A frame like a BACK relates to a number of earlier frames transmitted and in this case those frames may have been transmitted to different access points. Thus, when preparing a BACK or a similar frame, one needs information on whether the frames, which are acknowledged, were received or not regardless of to which access node they were addressed. In other words, at least some coordination is needed across the access points when preparing a BACK frame. Immediate ACK and CTS frames however relate to the previously received single frame. AP is the most logical entity to process ACK and CTS frames upon receiving a frame that requires such response type of frame.

The AP should also be able to indicate to the CU that the MPDUs that it is getting to be sent, are too large or too small, in response to which the CU can accordingly adapt the MPDU size.

Figure 7:
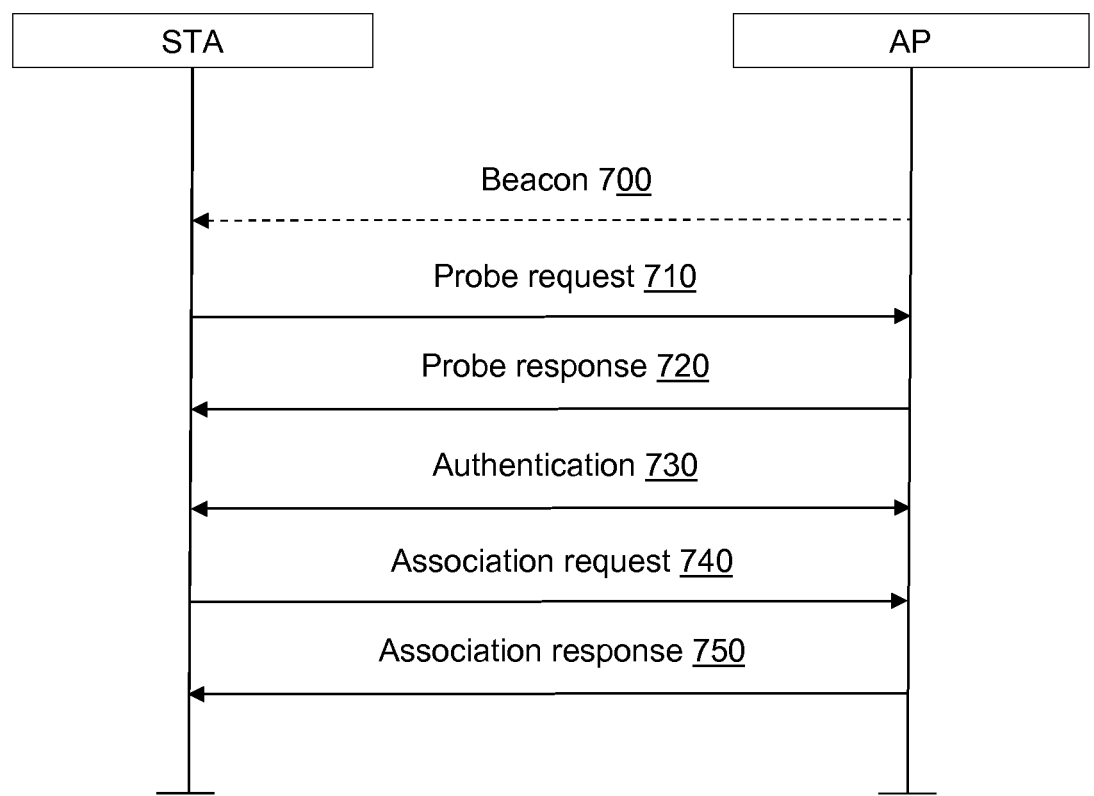
FIGS. 7 and 8 illustrate signalling examples in accordance with at least some embodiments.

FIG. 7 illustrates signalling between a STA and an AP. In some embodiments, the beacon frame 700 and/or probe response frame 720 may now comprise new information elements or capabilities, such as the NAID of the wireless network 50. In response to successful authentication 730, the STA may generate an association request 740 comprising the NAID. An AP may support both legacy association and presently disclosed network association. In some embodiments, a new frame is specified and applied for the network association, which may be referred to as a network association request frame. The beacon frame 700 and/or probe response frame 720 may comprise information about available and/or potential access nodes that the scanning wireless device may use when connecting to the network. This information to guide the wireless device in access node selection to support load balancing, for example. The new information, on the basis of the presently disclosed features, may be included in an existing frame type, or a new frame type may be defined.

Figure 8:
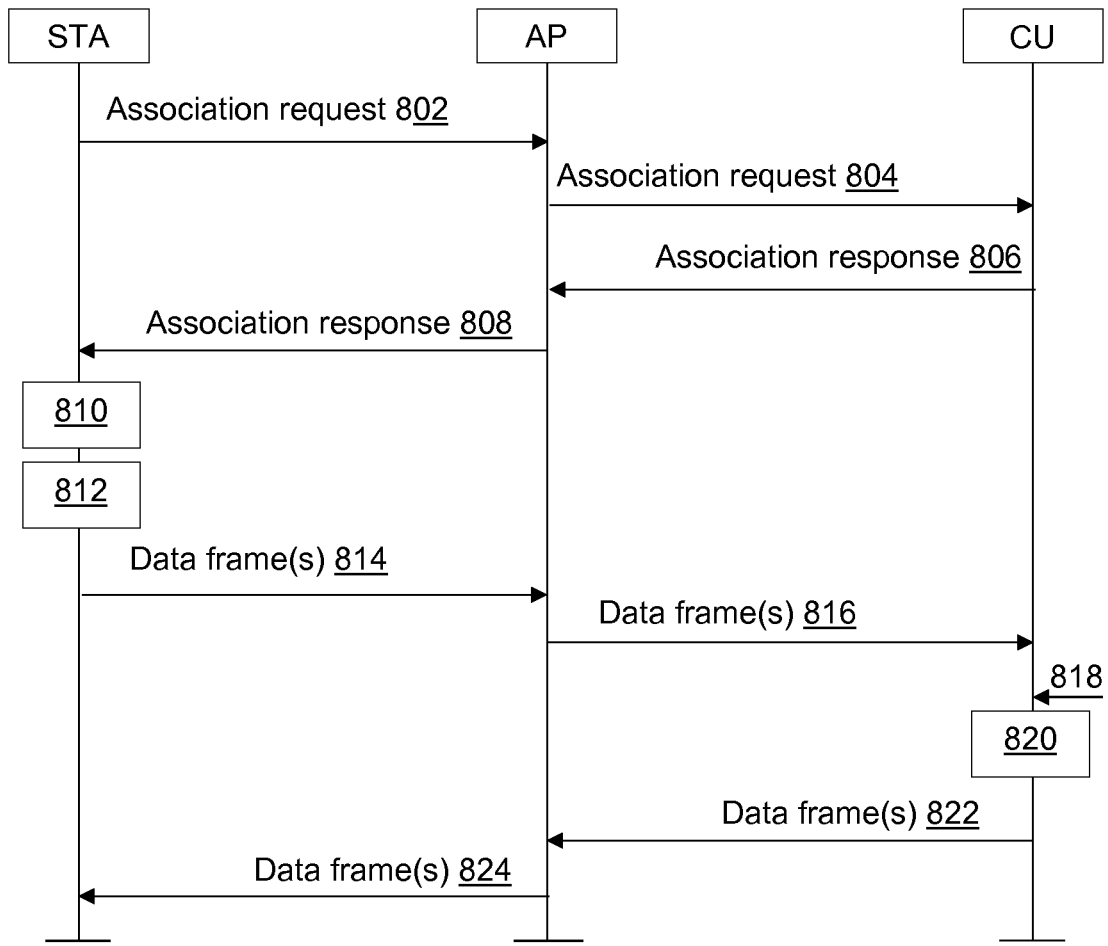

FIG. 8 further illustrates how the AP may forward (by message 804) the received association request 802 to the CU on the basis of the NAID or other indication in the association request to associate to the wireless network and the CU. The CU may establish the association for the STA to the wireless network and send an association response 806 for the STA to the AP. The AP may establish the association for the STA and send the association response 808 to the STA. On the basis of the received association response 808, the STA may establish 810 the association to the wireless network.

As already indicated e.g. in connection with the example of FIG. 3, for uplink data transmission, the STA may listen to the beacons of the APs and maintain a list of potential APs that it may use for transmission. In some embodiments, instead of being limited to use a primary channel, the STA may be configured to listen the entire channel bandwidth and select the channel(s) freely among the available channels. The STA may be configured to operate in one or more 20 MHz channels simultaneously based on their capability and needs. The channels are equal and independent and the STA may be configured to perform channel-access function for each channel separately. Such operation may be a new operating mode and may be referred to as primary-channel-less operation, for example. The STA may thus be configured to perform CCA/NAV/Backoff functions and counters for each channel. This further enables to improve channel use effectiveness. Contention may occur in each channel independently, and each channel may be used whenever available, regardless of the state and condition of other channels (and particularly the primary channel).

In addition, the STA may maintain a list of availability statuses of each AP: An AP is considered as available, if it does not have an ongoing TxOP as transmitter or receiver. The participation of an AP to TxOPs may be detected on the basis of received PPDU's NAV/duration infos and based on transmitter and receiver addresses.

Once the STA wins contention on at least one of the channels, it selects 812 at least one of the available APs as the recipient. It may use for example signal strength measurements from the received beacons as the way to select the AP. The STA then transmits data frame(s) 814 to the selected AP. When the selected AP receives MPDUs, it will forward the data frame(s) 814 to the CU.

For downlink transmissions, APs in the wireless network report to the CU periodically information on their status and measurements. The CU may be configured to maintain access node status information keeping track of which APs can hear which of the STAs associated to the wireless network. When the CU receives a DL packet 818, destined to a STA that is associated to it, the CU selects 820 an AP that is used to deliver the packet to the STA on the basis of the access node status information. The selection of an AP for downlink packet should not be standardized, but there are certain inputs that the CU could utilize while making the decision. The CU may apply for the selection 820 and receive information from the APs regarding at least one of:
- CCA state,
- NAV status,
- AP-STA signal strength,
- AP-STA signal quality, and
- AP load.

The CU will perform MAC layer processing for the received packet according to the applied split of functions between the CU and the AP, such as the split illustrated in FIG. 5. The CU then transmits the MPDU(s) 822 to the selected AP. The AP may perform the A-MPDU aggregation and the physical layer operations and transmit the packets 824 to the STA on any of the channels that the STA is using.

In some embodiments, the STA and/or the CU is configured to select multiple APs for a single transmission opportunity. In downlink direction, the CU may send the same MPDU(s) to more than one AP, to be transmitted to the STA. In such case the STA may simply discard the duplicates. This could be done to increase the reliability and decrease the latency of the transmission.

In uplink direction, similar redundancy may be applied. For this purpose, an STA transmitted frame may be modified to support informing multiple receiver addresses. The receiver may be indicated in the PLCP preamble part of the PDU, such as in a new SIG-X-field. When all the receivers are indicated in the preamble, the other STAs in the network get information that the receiver is not available for TxOP.

Legacy STAs may be supported in the wireless network with the functional split between the AP and the CU. The AP may support legacy association for the STA, or the CU is configured to manage the association and data transmission such that the only one AP is applied for the STA.

In some embodiments, the wireless device is an Extremely High Throughput (EHT) device. EHT is currently discussed in an IEEE 802.11 EHT study group (SG) to initiate discussions on new 802.11 features for bands between 1 and 7.125 GHz. The EHT's primary objective is to increase peak throughput and cell efficiency as well as to reduce latency to support high throughput and low latency applications, such as video-over-WLAN, augmented reality (AR) and virtual reality (VR). Such EHT devices may apply more spatial streams, increased bandwidth, and multiband switching, aggregation and operation.

While some embodiments have been described in the context of IEEE 802.11 based systems, it should be appreciated that these or other embodiments of the invention may be applicable in connection with other technologies configured to operate on licensed or non-licensed band, such as with wireless devices operating according to other versions of the IEEE 802.11 or other existing or future technologies using contention based access.

An electronic device comprising electronic circuitries may be an apparatus for realizing at least some embodiments of the present invention. The apparatus may be or may be comprised in a computer, a laptop, a tablet computer, a cellular phone, a machine to machine (M2M) device (e.g. an IoT sensor device), a wearable device, a base station, access point device, a network control device, or any other appropriately configured apparatus provided with communication capability. In another embodiment, the apparatus carrying out the above-described functionalities is comprised in such a device, e.g. the apparatus may comprise a circuitry, such as a chip, a chipset, a microcontroller, or a combination of such circuitries in any one of the above-described devices.

As used in this application, the term "circuitry" may refer to one or more or all of the following:
- (a) hardware-only circuit implementations (such as implementations in only analog and/or digital circuitry) and
- (b) combinations of hardware circuits and software, such as (as applicable):
  - (i) a combination of analog and/or digital hardware circuit(s) with software/firmware and
  - (ii) any portions of hardware processor(s) with software (including digital signal processor(s)), software, and memory(ies) that work together to cause an apparatus, such as a mobile phone or server, to perform various functions) and
- (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a wireless device or a similar integrated circuit in server, a cellular network device, or other computing or network device.

Figure 9:
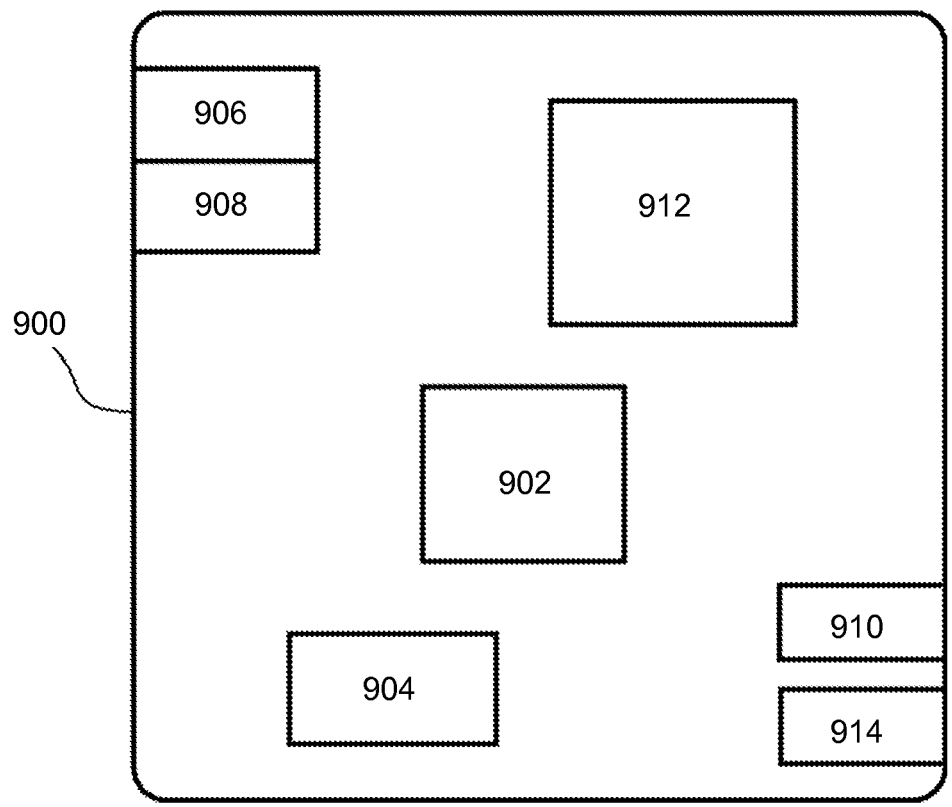
FIG. 9 illustrates an example apparatus capable of supporting at least some embodiments.

FIG. 9 illustrates an example apparatus capable of supporting at least some embodiments of the present invention. Illustrated is a device 900, which may comprise a communications device arranged to operate as the STA 10, 12 or the CU 30, for example. The device may include one or more controllers configured to carry out operations in accordance with at least some of the embodiments illustrated above, such as some or more of the features illustrated above in connection with FIGS. 2 to 8. The device may be configured to operate as the apparatus configured to carry out the method of FIG. 2 or 4, for example.

Comprised in the device 900 is a processor 902, which may comprise, for example, a single- or multi-core processor wherein a single-core processor comprises one processing core and a multi-core processor comprises more than one processing core. The processor 902 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 900 may comprise memory 904. The memory may comprise random-access memory and/or permanent memory. The memory may comprise at least one RAM chip. The memory may comprise solid-state, magnetic, optical and/or holographic memory, for example. The memory may be at least in part accessible to the processor 902. The memory may be at least in part comprised in the processor 902. The memory 904 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 900 but accessible to the device. For example, control parameters affecting operations related to establishing the association to the wireless network and/or selecting the access node for data transfer to/from the associated wireless device may be stored in one or more portions of the memory and used to control operation of the apparatus. Further, the memory may comprise device-specific cryptographic information, such as secret and public key of the device 900.

The device 900 may comprise a transmitter 906. The device may comprise a receiver 908. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 900 may comprise a near-field communication, NFC, transceiver 910. The NFC transceiver may support at least one NFC technology, such as NFC, Bluetooth, Wibree or similar technologies.

The device 900 may comprise user interface, UI, 912. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 904 or on a cloud accessible via the transmitter 906 and the receiver 908, or via the NFC transceiver 910, and/or to play games.

The device 900 may comprise or be arranged to accept a user identity module or other type of memory module 914. The user identity module may comprise, for example, a subscriber identity module, SIM, and/or a personal identification IC card installable in the device 900. The user identity module 914 may comprise information identifying a subscription of a user of device 900. The user identity module 914 may comprise cryptographic information usable to verify the identity of a user of device 900 and/or to facilitate encryption and decryption of communication effected via the device 900.

The processor 902 may be furnished with a transmitter arranged to output information from the processor, via electrical leads internal to the device 900, to other devices comprised in the device. Such a transmitter may comprise a serial bus transmitter arranged to, for example, output information via at least one electrical lead to memory 904 for storage therein. Alternatively to a serial bus, the transmitter may comprise a parallel bus transmitter. Likewise the processor may comprise a receiver arranged to receive information in the processor, via electrical leads internal to the device 900, from other devices comprised in the device 900. Such a receiver may comprise a serial bus receiver arranged to, for example, receive information via at least one electrical lead from the receiver 908 for processing in the processor. Alternatively to a serial bus, the receiver may comprise a parallel bus receiver.

The device 900 may comprise further devices not illustrated in FIG. 9. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 910 and/or the user identity module 914.

The processor 902, the memory 904, the transmitter 906, the receiver 908, the NFC transceiver 910, the UI 912 and/or the user identity module 914 may be interconnected by electrical leads internal to the device 900 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or functional features may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, embodiments are not limited to the examples described above but may vary within the scope of the claims.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless communications.

Acronyms List

AP Access point
ASIC Application-specific integrated circuit
BSS Basic service set
CCA Clear channel assignment
CRC Cyclic redundancy check
CSMA Carrier sense multiple access
EHT Extremely high throughput
ESS Extended service set
FPGA Field-programmable gate array
GSM Global system for mobile communication
HESSID Homogenous ESS identifier
LTE Long term evolution
M2M Machine to machine
MPDU MAC protocol data unit
NAID Network association identifier
NAV Network allocation vector
NFC Near-field communication
PLCP Physical layer convergence protocol
PPDU PLCP protocol data unit
STA Station
UI User interface
URLLC Ultra-reliable low latency communications
WCDMA Wideband code division multiple access
WLAN Wireless local area network

The invention claimed is:

1. A wireless device, comprising
at least one processor,
at least one memory storing instructions that when executed by the at least one processor, cause the wireless device at least to:
transmit an association request from the wireless device to a first access node of a wireless network for associating the wireless device to the wireless network,
receive, by the wireless device, an association response from the first access node for associating the wireless device to the wireless network, perform, by the wireless device, carrier sensing on a plurality of channels;
wherein the carrier sensing comprises contending for channel access on the plurality of channels, and maintaining one or more records of ongoing transmission opportunities on the plurality of channels,
wherein the one or more records comprise information on which access nodes of the wireless network are owners or receivers of the ongoing transmission opportunities on one or more of the plurality of channels,
select a second access node of the wireless network in response to obtaining a transmission opportunity for a channel of the plurality of channels,
wherein the selecting is based at least partly on the one or more records; and
transmit data from the wireless device to the second access node during the transmission opportunity.

2. The wireless device of claim 1, wherein the at least one memory is storing instructions executed by the at least one processor, further cause the wireless device to:
perform the selection of the second access node based on the one or more records indicating said second access node being available without an ongoing transmission opportunity on the channel where the transmission opportunity is obtained, and based on received signal strength values of a number of access nodes, including the second access node.

3. The wireless device of claim 1, wherein the at least one memory is storing instructions executed by the at least one processor, to further cause the wireless device to perform the selection of the second access node among the plurality of access nodes of the wireless network which are determined not being owners or receivers of the ongoing transmission opportunities on any channel of the plurality of channels.

4. The wireless device of claim 1, wherein the wireless device becomes owner of the transmission opportunity and the wireless device is configured to select the second access node in response to winning contention on the channel of the plurality of channels.

5. The wireless device of claim 1, wherein the second access node is different from the first access node and is configured to forward the data from the wireless device to a centralized unit.

6. The wireless device of claim 1, wherein the at least one memory is storing instructions executed by the at least one processor, to further cause the wireless device to select the first access node or a third access node of the wireless network for transmission during another transmission opportunity within the same association between the wireless device and the wireless network.

7. The wireless device of claim 6, wherein said another transmission opportunity starts after end of the transmission opportunity.

8. The wireless device of claim 6, wherein said another transmission opportunity is overlapping with the transmission opportunity.

9. The wireless device of claim 6, wherein said another transmission opportunity is based on winning contention on the channel.

10. The wireless device of claim 6, wherein said another transmission opportunity is based on winning contention on another channel of the plurality of channels.

11. The wireless device of claim 1, wherein the association to the wireless network is an association to a centralized unit.

12. The wireless device of claim 1, wherein the association request comprises at least one of a network association identifier or a request for associating the wireless device to the wireless network.

13. The wireless device of claim 1, wherein the wireless device is a station, the access node is an access point, and the wireless network is a wireless local area network.

14. A wireless communications device, comprising at least one transmitter, at least one receiver, a user interface, and the wireless device of claim 1.

15. The wireless device of claim 1, wherein the wireless device comprises a centralized unit and a plurality of access nodes, including the first access node.

16. A method performed by a wireless device comprising:
transmitting an association request from the wireless device to a first access node of a wireless network for associating the wireless device to the wireless network,
receiving, by the wireless device, an association response from the first access node for associating the wireless device to the wireless network, performing, by the wireless device, carrier sensing on a plurality of channels;
wherein the carrier sensing comprises contending for channel access on the plurality of channels, and maintaining one or more records of ongoing transmission opportunities on the plurality of channels,
wherein the one or more records comprise information on which access nodes of the wireless network are owners or receivers of the ongoing transmission opportunities on one or more of the plurality of channels, selecting a second access node of the wireless network in response to obtaining a transmission opportunity for a channel of the plurality of channels, and
wherein the selecting is based at least partly on the one or more records, and
transmitting data from the wireless device to the second access node during the transmission opportunity.

17. The method of claim 16, comprising:
performing the selection of the second access node based on the one or more records indicating said second access node being available without an ongoing transmission opportunity on the channel where the transmission opportunity is obtained, and based on received signal strength values of a number of access nodes, including the second access node.

18. The method of claim 16, further comprising: selecting the first access node or a third access node of the wireless network for transmission during another transmission opportunity within the same association between the wireless device and the wireless network.

19. The method of claim 16, wherein the association to the wireless network is an association to a centralized unit.

20. The method of claim 16, wherein the association request comprises at least one of a network association identifier or a request for associating the wireless device to the wireless network.

21. A non-transitory computer readable medium comprising program instructions for causing a wireless device to perform at least the following:
transmitting an association request from the wireless device to a first access node of a wireless network for associating the wireless device to the wireless network,
receiving, by the wireless device, an association response from the first access node for associating the wireless device to the wireless network, performing, by the wireless device, carrier sensing on a plurality of channels;
wherein the carrier sensing comprises contending for channel access on the plurality of channels, and maintaining one of more records of ongoing transmission opportunities on the plurality of channels,
wherein the one or more records comprise information on which access nodes of the wireless network are owners or receivers of the ongoing transmission opportunities on one or more of the plurality of channels,
selecting a second access node of the wireless network in response to obtaining a transmission opportunity for a channel of the plurality of channels,
wherein the selecting is based at least partly on the-one or more records, and
transmitting data from the wireless device to the second access node during the transmission opportunity.

22. The method of claim 16, wherein the wireless network comprises a centralized unit and a plurality of access nodes, including the first access node.

23. The method of claim 16, further comprising:
performing the selection among the plurality of access nodes which are determined not being owners or receivers of the ongoing transmission opportunities on any channel of the plurality of channels.

* * * * *